United States Patent Office 3,572,382
Patented Mar. 23, 1971

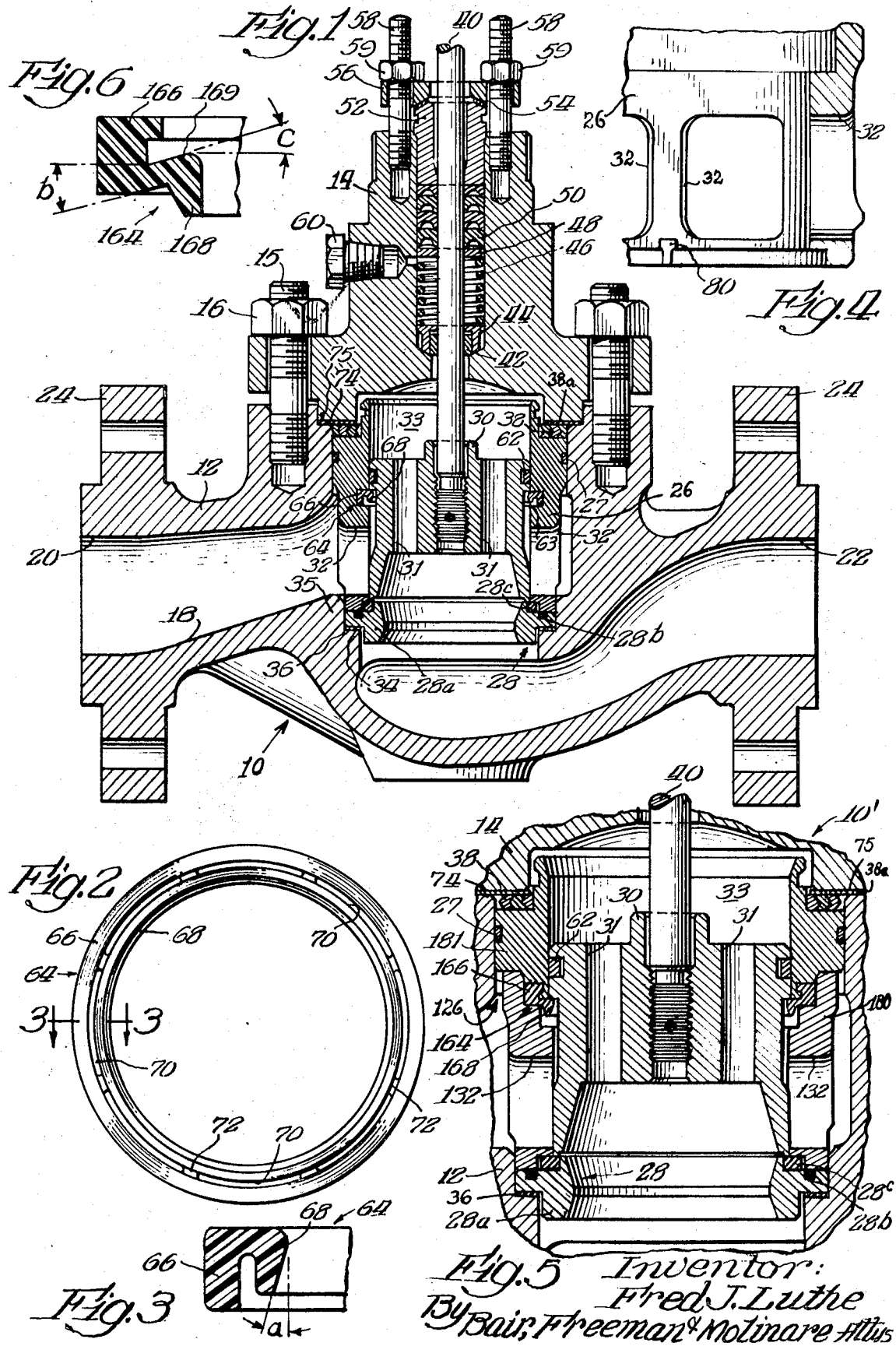

3,572,382
SINGLE-PORTED DOUBLE-SEATED
VALVE MECHANISM
Fred J. Luthe, 102 Columbus Drive,
Marshalltown, Iowa 50158
Filed Jan. 31, 1969, Ser. No. 795,496
Int. Cl. F16k 39/02
U.S. Cl. 137—625.35   13 Claims

ABSTRACT OF THE DISCLOSURE

A single-ported double-seated valve mechanism including a valve plug adapted to engage a first valve seat for terminating fluid flow through a flow passage in a valve body means and second valve seat means cooperating with the valve plug to seal only when the valve plug is in the closed position against the first valve seat means. The valve mechanism is designed so that no seat-to-seat spacing adjustments are required, there is no sliding seal friction of the second seat means against the valve plug to adversely affect the positioning of the valve plug, a minimum of stem force is needed to shut off the valve plug bubble-tight and the valve seat means can be readily replaced.

BACKGROUND OF THE INVENTION

This invention relates to a valve mechanism and, more particularly, to an improved globe-style valve mechanism of the type that is balanced and uses composition seals to give positive shut-off.

There are two general kinds of valves that are currently being used that are balanced and use composition seals for positive shut-off. These are double-ported, double-seated valves and single-ported, single-seated valves. The double-ported, double-seated valves have two ports of the same diameter to give a balanced condition. Part of the fluid flows up through one port and the other part of the fluid flows down through the other port. An example of this kind of design is illustrated in U.S. Pat. 3,087,735. A disadvantage of this design is that the valve plug has to be assembled inside of the valve body because the two ports in the valve body are of the same diameter. Additionally, the seat-to-seat spacing of the valve plug with respect to the two ports must be made adjustable to give a reasonable low stem force necessary for tight shut-off of the valve. This adjustment is most often done by trial and error and is difficult and time-consuming. Another disadvantage of this construction is that an opening must be provided in the side of the valve body to allow requisite assembly and adjustment of the valve plug. Maintenance of a low stem force to shut off a valve of this kind is quite important, as it is often used with a pressure regulator having a small actuator stem force available.

The single-ported, single-seated valves have a balancing piston operating in a balance chamber to give the balanced feature. An example of this kind of design is the Model AC valve body manufactured by the Fisher Governor Company. A disadvantage of this design is that a sliding friction seal is used between the balancing piston and the balanced chamber cylinder. The friction of this sliding seal is usually so high that the valve plug cannot be positioned accurately with the low stem forces generally available in the pressure regulators utilized in such applications.

An object of the present invention is to provide an improved valve mechanism wherein the disadvantages and deficiencies of prior designs are obviated.

Another object of the present invention is to provide a novel single-ported, double-seated valve mechanism wherein no seat-to-seat spacing adjustments are required and wherein there is no sliding seal friction to adversely affect the positioning of the valve plug.

Still another object of this invention is to provide an improved valve mechanism having a valve plug cooperating with a first valve seat means and a second valve seat means with the second seat means including an annular seal having a flexible lip sealingly engaging the valve plug only when the valve plug is in the closed position against the first valve seat means such that no seat-to-seat spacing adjustment is needed.

Yet another object of the present invention is to provide a single-ported double-seated valve mechanism incorporating a first seal and a second seal, with the second seal bearing against the valve plug only when it is in the closed position, such second seal including a flexible lip portion adapted to engage the exterior seating surface of the valve plug, the flexible lip portion being urged toward sealing relationship by the pressure within the flow passage and being preloaded in use to assure a tight sealing relationship with said exterior seating surface. Other objects and advantages of the present invention will become more apparent hereinafter.

BRIEF DESCRIPTION OF THE DRAWINGS

There is illustrated in the attached drawing presently preferred embodiments of the present invention wherein like numerals refer to like elements and wherein:

FIG. 1 is a cross-sectional view of a valve mechanism embodying principles of the present invention;

FIG. 2 is a bottom view of the upper valve seal of the embodiment of FIG. 1;

FIG. 3 is a detail cross-sectional view of the upper valve seal of FIG. 2 taken generally along the line 3—3;

FIG. 4 is a detail cross-sectional view of a portion of the valve cage;

FIG. 5 is an enlarged detail cross-sectional view of a modified valve mechanism embodying principles of the present invention; and FIG. 6 is a detail cross-sectional view of the modified upper valve seal of the embodiment of FIG. 5 shown substantially in the same fashion as the cross-sectional views of the upper valve seal of FIG. 3.

DESCRIPTION OF PRESENTLY PREFERRED EMBODIMENTS

Referring to FIG. 1 of the drawing there is illustrated a valve mechanism 10 embodying the present invention. The valve mechanism 10 comprises a valve housing or valve body means defined by a valve body 12 and a valve bonnet 14 secured together by suitable fastening means, as, for example, a plurality of studs 15 and nuts 16. Defined within the valve body 12 is a fluid flow passageway 18 which communicates an inlet 20 with an outlet 22. The valve body 12 is provided with suitable flanges 24 which are adapted to be connected to flanges of a pipeline or fluid conduit in a conventional manner. It will be readily apparent that other means may be employed to connect the valve body 12 in fluid circuit to a pipeline.

Disposed within the valve body means is a valve cage 26, seat ring means 28 sandwiched between the wall 35 of the valve body 12 and the valve cage 26 and a valve plug 30 slidably guided within the valve cage 26 for movement toward and away from the seat ring means 28. The valve cage 26 comprises a tubular sleevelike member having a plurality of characterized openings or ports 32 in the wall thereof. Seal ring 27 is positioned in a recess about the valve cage 26 for sealing between the valve cage 26 and the body 12.

The valve seat ring means 28 is comprised of a seat ring 28a having an opening therethrough forming a part of the fluid flow passageway in the valve body 12. The top of the seat ring 28a is engaged by the valve cage 26 and urged into seating engagement with an annular shoulder 34 in the interior wall 35 of the valve body 12. The valve seat ring means 28 also includes an O-ring seal 28b disposed between the cooperating abutting surfaces of the valve seat ring 28a and a first seal means or port seal 28c. The O-ring seal 28b is utilized to prevent a leak path between the port seal 28c and the seat ring 28a when a plastic seal material is used. The port seal 28c is adapted to be engaged by the lower surface of the valve plug 30 to seal fluid flow through the passageway 18.

Disposed in a recess adjacent the upper end of valve plug 30 is a ring 62 for minimizing vibration of valve plug 30 within valve cage 26. The ring 62 reduces the fluid flow through the small annular space between valve plug 30 and valve cage 26. Bores 31 extend through the valve plug 30 for equalizing pressure in the chamber 33 above the valve plug with the pressure below the valve plug, thereby minimizing the magnitude of the unbalanced fluid force acting on the valve plug 30.

The valve cage 26 and the seat ring means 28 are sandwiched between a gasket 36 on the shoulder 34 within the wall 35 and a seal 38 between the bonnet 14 and the top of the cage 26. The parts are retained in assembled relationship by tightening nuts 16 down on studs 15 to clamp the bonnet 14 to the valve body 12.

Valve plug 30 is movable reciprocably within the valve cage 26 by means of the valve stem 40 which is adapted to be connected at its upper end to a suitable actuator mechanism.

The valve stem 40 extends from the valve plug 30 through an opening in the bonnet 14 and passes through a wiper 42 disposed in an annular ring 44, a biasing spring 46, a washer 48, a packing assembly 50, a packing follower 52, a wiper 54 of felt or like material and a packing plate 56. The operating end of the valve stem 40 extends through the packing plate 56 for connection to an actuator mechanism. The packing plate 56 is secured to the bonnet 14 by means of studs 58 and nuts 59 and tightening the nuts 59 onto studs 58 will increase the sealing pressure of the packing rings. Plug 60 closes a grease access opening to the chamber in the bonnet 14 within which the spring 46 is disposed. The packing arrangement is not part of the present invention and other packing arrangements can be used.

A feature of this invention is the incorporation into the valve design of a unique upper seat means which seats against a sealing surface on the exterior of the valve plug 26 only when the valve plug 26 is in closed position against the lower valve seat means or first valve seat means 28. Among the advantages of the novel upper seal construction of this invention are that no seat-to-seat spacing adjustments are needed, there is no sliding seal friction to adversely affect the positioning of the valve plug and a minimum of valve stem force is needed to shut off the valve plug bubble-tight.

In operation with the valve plug open, neither the first valve seat means 28, nor the second valve seat means 64 are in engagement with the valve plug 30.

Referring to FIGS. 1, 2, and 3, consideration will be given to the detail of construction of the upper seal 64. The upper seal 64 includes an outer annular base portion 66 connected to an inwardly disposed flexible lip portion 68. The upper seal 64 is received in a recess 63 in the valve cage 26 and in the installed position is in the form of an inverted J or an inverted L. The flexible lip 68 extends a small distance inwardly into the passageway within which the valve plug 30 moves and the valve plug exterior surface is recessed so as to form an upper sealing shoulder on the valve plug 30 and so that the lip 68 of the upper seal 64 does not contact the exterior surface of the valve plug when the valve plug is in the open position. The flexible lip 68 was made relatively thick with respect to the amount that the upper seal 64 protrudes inwardly from the cage 26 so as to prevent the upper seal 64 from bending with a cantilever-type motion to follow the valve plug in its travel. Furthermore, the upper seal 64 was made intermittently rigid by incorporating in the design the grooves 70 and the ribs 72. As best shown in FIGS. 2 and 3, the grooves 70 are annular and lie in a circle, being separated from one another by the stiffening ribs 72.

As the valve plug 30 moves upwardly from engagement with the upper seal 64, it will first begin to leak about the ribs 72, since these are the most rigid points along the circumference of the upper seal 64. The sections of the upper seal between the ribs 72 are more flexible and will follow the valve plug 30 more easily. Once a leak path is started, the upper seal 64 will release itself from the valve plug 30. By virtue of this construction, the upper seal 64 is flexible enough to keep the valve stem forces low, but rigid enough in the opposite direction to help prevent the seal lip 68 from tending to follow valve plug travel.

The radially inner surface of the flexible lip 68 of the upper seal 64 is radiused or curved to insure that the sealing line of contact with the valve plug does not shift to a different diameter as the valve plug 30 is traveled off of the first seat means 28. A shift in sealing diameter could result in a change of area and since the pressure within the passageway 18 is acting on the upper seal 64, it would be measured as a change of valve stem force.

The upper seal 64 is made of an elastomeric material and can be installed in a groove or recess 63 in the valve cage 26 in the same manner that an O-ring is installed in the internal diameter of a cylinder. The valve plug 30 has the proper lead-in angle at its upper end (the upper edge being chamfered), so that it can be installed into the valve cage 26 by pushing it upward through the valve cage. The inner surface of the flexible lip 68 of the upper seal also has a leadin angle as indicated by the angle $a$ in FIG. 3 to help press it back out of the way when the valve plug 30 is pushed past it. The flexibility of the upper seal 64 accommodates manufacturing variance and thus no adjustment is required between the two sealing or seating surfaces on the valve plug 26.

The port seal 28c is designed so as to require little stem force to shut off the valve plug leak tight. The sealing edge of the valve plug 30 is essentially a knife edge and has a small radius rather than a true knife edge so as to be practical for manufacturing purposes. The port seal 28c is well-protected from impingement with the flowing fluid to insure long life and can be made of either an elastomeric or a plastic material consistent with service conditions.

The shoulder 74 on the lower end of the bonnet 14 in cooperation with a flat seal 38a is adapted to abut a shoulder 75 on the top of the valve body 12 such as to provide a positively controlled optimum compression on the spring seal 38. Seal 38 is preferably of the spiral wound type.

Referring to FIG. 4, it is seen that pressure relief passages 80 are provided in the valve cage 26 to equalize the pressure at the outside edge of the ring seal 28c with that at the point where the seal is exposed to the fluid flow. This helps to keep the ring seal 28c in place at high pressure drop conditions. Where the valve plug 30 is traveled open to a position just off the seat means 28, the flow area at this point is quite small relative to that of the upstream valve sections. If there is a high pressure drop then the static pressure at this point of flow restriction is quite small. This causes a high pressure difference across the seal which tends to force it out of position. The equalization of pressure eliminates the problem of an elastomeric seal being blown out of position. The pressure limit with elastomeric seals in this design is that pressure which will still give a reasonable seal life considering flow conditions and fluid impingement on the seal.

Refering now to FIG. 5, there is illustrated a modified valve mechanism 10' similar to that of the valve mechanism of FIG. 1, and differing basically in the shape of the upper seal 164 and its means of retention. An advantage of this modification is that it can be easily disassembled and re-assembled for convenient and complete inspection of all working parts.

With the seal design of FIGS. 1, 2 and 3, there was a possibility of damaging the upper seal 64 by installing the valve plug 30 downward into the cage, rather than upward into the cage. The proper assembly procedure was to install the valve plug 30 up into the valve cage 26 from its bottom, then setting the valve cage 26 and the valve plug 30 as a unit into the valve body 12. An advantage of the modified design illustrated in FIGS. 5 and 6 is that no specific assembly procedure is necessary and the parts can be simply stacked into the valve body 12, with the only requirement being that of having the parts in the proper place when assembly is completed.

An important advantage of the modified design is that the valve plug 30 can be easily withdrawn and replaced into position without removal of the rest of the valve parts. This is important where it is necessary to frequently inspect the condition of the elastomeric seals as is common for valves used in the natural gas industry. A critical feature of the upper seal 164 are the angles $b$ and $c$ (FIG. 6). The angles are chosen so that the valve plug 30 will act to press the upper seal 164 back out of the way as the valve plug 30 is withdrawn from the valve cage. In addition, the upward angle of the surface 169 of lip 168 will tend to preload the seal 164 and assure that it is always seated against the sealing surface of the valve plug 30 when the valve plug is seated against the first valve seat means 28c. In a presently preferred embodiment of the invention, the angles $b$ and $c$ are each 15 degrees.

After the valve plug 30 has been removed from the valve cage, the condition of the sealing edges of both the upper seal 164 and the port seal 28c can be visually inspected without the removal of other parts.

The valve plug 30 can be replaced by pushing it down into position and as it is replaced, its bottom edge will strike the upper edge of the upper seal 164 and deflect it downward and outward into the clearance provided for it in the upper part of the valve cage portion 180. As the resilient upper seal 164 deflects, it will allow the valve plug 30 to pass through it. After the valve plug 30 is in position, the elastomeric upper seal 164 will return to its original position to act as a seal.

It is to be noted in the modified valve mechanism 10' of FIG. 5 that the valve cage 126 is comprised of two components, essentially, a cage portion 180 and a cage retainer 181. The two parts are constructed and arranged so as to receive the radially outwardly disposed base portion 166 of the upper seal 164 and retain same therebetween. Preferably, the lower end of the cage retainer 181 has an outwardly extending flange-like portion adapted to engage with a recessed portion within the upper seal 164 such that when the cage portion 180 and cage retainer 181 are in assembled relationship, the upper seal 164 will be secured therebetween.

The shape of the upper seal 164 differs from that of seal 64 in the embodiment of FIGS. 1, 2 and 3. Essentially, the intermittent rigidifying feature provided by the ribs 72 is omitted. In the design of FIGS. 2 and 3, it was necessary to install the upper seal 64 into the groove or recess 63 provided for it in the internal diameter of the valve cage 26 in the same manner that an O-ring is installed in the internal diameter of a cylinder. In the embodiment of FIGS. 5 and 6, the upper seal 164 is much easier to put into position because it is simply installed onto the lower edge of the cage retainer 181 before the cage retainer is placed into the valve body. A harder elastomer material may be used for the upper seal and the sealing edge may be made somewhat thicker than the embodiment of FIGS. 2 and 3. By using a harder material and increasing the thickness of the sealing edge, it was found that the intermittent rigidifying feature was not needed. Furthermore, in the embodiment of FIG. 1 the valve plug had to be inserted into the cage from the bottom thereof, whereas in the embodiment of FIG. 5, the valve plug can be inserted and removed from either the top or the bottom of the valve cage.

There has been provided by the present invention an improved valve mechanism incorporating a novel upper sealing means designed to seal only when the valve plug is in the closed valve position against a first valve seat means. As a result of this design in a single-ported double-seated valve, no seat-to-seat spacing adjustments are required. There is no sliding seal friction of the second seat means against the valve plug to adversely effect the positioning of the valve plug. A minimum stem force is required, therefore, to shut off the valve plug bubble-tight. Seal replacement is facilitated, particularly, with the embodiment of FIG. 5.

While there has been shown and described presently preferred embodiments of the invention, it will be understood that the invention is not limited thereto, since it may be otherwise embodied within the scope of the following claims.

I claim:
1. A single-ported double-seated valve mechanism comprising valve body means having an inlet and an outlet communicated by a flow passage, first valve seat means in said flow passage and a valve plug cooperating with said first valve seat means to control fluid flow through said flow passage, second valve seat means for sealing between the valve plug and the valve body means, said second valve seat means comprising an annular seal having an inwardly extending flexible lip, the valve plug having a sealing surface on the side thereof and said flexible lip being engaged with the said sealing surface on the valve plug only when the valve plug is seated against the first valve seat means, said annular seal including an outwardly disposed base portion and an inwardly extending flexible lip capable of movement relative to the base portion, and spaced ribs provided between said base portion and said lip, the first sections of the lip between the ribs being more rigid than those second sections adjacent the ribs.

2. A valve mechanism as in claim 1 wherein said annular seal and said valve plug are constructed and arranged such that the flexible lip engages the said sealing surface on the valve plug a short distance of valve plug travel before the valve plug engages the first valve seat means.

3. A valve mechanism as in claim 1 wherein the side of the valve plug means is provided with a recessed region which defines a space in cooperation with the valve body means, the annular seal being disposed on the high pressure side of said space.

4. A valve mechanism as in claim 3 wherein fluid pressure in the flow passage upstream of the first valve seat means urges the flexible lip into sealing engagement with said sealing surface on the valve plug.

5. A valve mechanism as in claim 1 wherein the valve body means includes a valve body and a valve cage fixedly positioned in said valve body, said annular seal disposed in a recess in said valve cage.

6. A valve mechanism as in claim 1 wherein the valve body means includes a valve body, a valve cage in said valve body, and a cage retainer for securing the valve cage in position in said valve body, the annular base portion of said annular seal being retained between said valve cage and said cage retainer.

7. A valve mechanism as in claim 6 wherein pressure relieving passage means are provided in the valve cage for equalizing pressure on the outside edge of the first valve seat means with that at the place where the first valve seat means is exposed to fluid flow in the flow passage.

8. A valve mechanism as in claim 1 wherein the inner surface of the flexible lip has a lead-in angle complementary to a lead-in angle at the upper end of the valve plug, whereby the valve plug can be pushed past the flexible lip during assembly of the valve plug into the valve body means.

9. A single-ported double-seated valve mechanism comprising valve body means having an inlet and an outlet communicated by a flow passage, first valve seat means in said flow passage and a valve plug cooperating with said first valve seat means to control fluid flow through said flow passage, second valve seat means for sealing between the valve plug and the valve body means, said second valve seat means comprising an annular seal having an inwardly extending flexible lip, the valve plug having a sealing surface on the side thereof and said flexible lip being engaged with the said sealing surface on the valve plug only when the valve plug is seated against the first valve seat means, said annular seal including an outwardly disposed base portion and an inwardly extending flexible lip capable of movement relative to the base portion, said flexible lip having an upwardly inclined upper surface for engaging the sealing surface on the valve plug, whereby the annular seal is preloaded as the valve plug engages the first valve seat means in the movement of the valve plug to closed position.

10. A valve mechanism as in claim 9 wherein the upper surface of the flexible lip is inclined at an angle of 15 degrees to a transverse plane through the valve body means, the valve plug acting to press the flexible lip out of the way in the event the valve plug is withdrawn from the valve body means.

11. A valve mechanism as in claim 9 wherein the radially inner surface of the flexible lip is curved to insure that the sealing line of contact with the valve plug does not shift to a different diameter as the valve plug is traveled away from the valve seat means.

12. A valve mechanism comprising a valve body having an inlet and an outlet communicated by a flow passage, valve seat means in said flow passage, including a resilient ring seal, a valve plug cooperating with said ring seal to control fluid flow through said flow passage, a valve cage in said valve body, said valve plug being movable in said valve cage, and pressure relieving passage means in the valve cage for equalizing pressure at the outside edge of the ring seal with that at the place where the ring seal is exposed to fluid flow in the flow passage so as to keep the ring seal in place at high pressure drop conditions.

13. In a valve mechanism comprising a valve body having an inlet and an outlet communicated by a flow passage, first valve seat means in said flow passage and a valve plug cooperating with said first valve seat means to control fluid flow through said flow passage, said valve plug having a sealing surface on the side thereof, and second valve seat means for sealing between the valve plug sealing surface and the valve body means, characterized by the second valve seat means comprising an annular seal having an outwardly disposed base portion in the valve body means and an inwardly extending flexible lip capable of movement relative to the base portion, said flexible lip having an upwardly inclined upper surface engaging the valve plug sealing surface for preloading the annular seal as the valve plug engages the first valve seat means during movement of the valve plug to closed position.

References Cited

UNITED STATES PATENTS

| | | | |
|---|---|---|---|
| 537,201 | 4/1895 | Haldeman | 137—625.35 |
| 2,294,702 | 9/1942 | Van Der Werff | 251—282X |
| 2,854,023 | 9/1958 | Heyer | 137—625.35X |

FOREIGN PATENTS

| | | | |
|---|---|---|---|
| 176,653 | 1917 | Canada | 137—625.35 |
| 809,667 | 1936 | France | 251—282 |
| 850,833 | 1952 | Germany | 251—282 |

ARNOLD ROSENTHAL, Primary Examiner

U.S. Cl. X.R.

251—282